United States Patent [19]
Ubillos

[11] Patent Number: 5,999,173
[45] Date of Patent: Dec. 7, 1999

[54] METHOD AND APPARATUS FOR VIDEO EDITING WITH VIDEO CLIP REPRESENTATIONS DISPLAYED ALONG A TIME LINE

[75] Inventor: Randy Ubillos, Sunnyvale, Calif.

[73] Assignee: Adobe Systems Incorporated, San Jose, Calif.

[21] Appl. No.: 07/863,432

[22] Filed: Apr. 3, 1992

[51] Int. Cl.⁶ .................................................. G06F 15/20
[52] U.S. Cl. ........................................................ 345/328
[58] Field of Search .................................... 395/161, 154, 395/159; 343/575, 719, 715, 718; 358/182, 183, 328, 334, 346, 951, 960, 967, 977

[56] References Cited

U.S. PATENT DOCUMENTS

| | | | |
|---|---|---|---|
| 4,538,188 | 8/1985 | Barker et al. | 360/14.3 |
| 4,746,994 | 5/1988 | Ettlinger | 360/13 |
| 4,754,342 | 6/1988 | Duffy | 360/14.3 |
| 4,868,687 | 9/1989 | Penn et al. | 360/13 |
| 4,943,866 | 7/1990 | Barker et al. | 358/335 |
| 5,101,364 | 3/1992 | Davenport et al. | 395/152 |
| 5,109,482 | 4/1992 | Bohrman | 395/154 |

(List continued on next page.)

FOREIGN PATENT DOCUMENTS

| | | | |
|---|---|---|---|
| 0 113 993 | 7/1984 | European Pat. Off. | G11B 27/02 |
| 0 390 048 | 10/1990 | European Pat. Off. | G11B 27/00 |
| 0 438 299 A2 | 7/1991 | European Pat. Off. | G11B 27/034 |
| 0 469 850 A2 | 2/1992 | European Pat. Off. | G11B 27/034 |
| 0 526 064 A2 | 2/1993 | European Pat. Off. | G11B 27/028 |
| 2 630 572 | 10/1992 | France | G11B 27/028 |
| 91/10321 | 7/1991 | WIPO | G11B 27/034 |

OTHER PUBLICATIONS

Tonomura et al., "Content Oriented Visual Interface Using Video Icons for Visual Database Systems", IEEE Workshop on Visual Languages, pp. 68–73, Oct. 1989.

Aker, Sharon Z., "Roll Over, Walt Disney," MacUser, pp. 150–152, 154, 156–157, Mar. 1988.

Clouser, Charles, "MediaTracks 1.0." MacWorld, pp. 198 and 200, Jan. 1991.

Biedny, David, "MacroMind Director 2.0," MacWorld, pp. 249 and 251, Oct. 1990.

Krutz, Jamie, "KNVB's Macs go video.", MacWeek, V2 N43 pS84(3), Dec. 1988.

(List continued on next page.)

*Primary Examiner*—Robert W. Beausoliel, Jr.
*Assistant Examiner*—Stephen Elmore
*Attorney, Agent, or Firm*—Fish & Richardson P.C.

[57] ABSTRACT

A method and apparatus, in which video clips (and optionally also still image and audio clips) are stored as digital data in a computer memory, selected clips are displayed in elongated tracks on a display screen, and editing operations are performed on the clips in response to manipulation of displayed cursors and icons to assemble and preview an edited video program. Preferably, the inventive apparatus is a computer system programmed to display video, still image, and audio clips, and special effect icons, in tracks along a displayed time line. The system assembles a video program from stored clips in response to arrangement of displayed clips and special effect icons in a desired sequence along the time line. The computer system is preferably programmed: to select a new in or out point for a clip by positioning a cursor at an edge of the displayed clip and dragging the edge relative to the time line, to select a special effect transition between displayed clips by positioning a transition icon in a special track in alignment with overlapping portions of the clips, to select special effect parameters by manipulating an icon in a special effects track, to filter selected video clips with a mosaic filter having user-selectable time-varying filter characteristics, and to control superimposition of an overlay clip with a main clip in response to manipulation of a level control icon displayed in alignment with the overlay clip.

36 Claims, 7 Drawing Sheets

U.S. PATENT DOCUMENTS

| | | | |
|---|---|---|---|
| 5,119,474 | 6/1992 | Beitel et al. | 345/302 |
| 5,148,154 | 9/1992 | MacKay et al. | 340/712 |
| 5,191,645 | 3/1993 | Carlucci et al. | 395/159 |
| 5,202,961 | 4/1993 | Mills et al. | 345/328 |
| 5,206,929 | 4/1993 | Langford et al. | 395/159 |
| 5,218,672 | 6/1993 | Morgan et al. | 395/162 |
| 5,237,648 | 8/1993 | Mills et al. | 395/133 |
| 5,274,758 | 12/1993 | Beitel et al. | 345/302 |
| 5,307,456 | 4/1994 | MacKay | 395/154 |
| 5,317,732 | 5/1994 | Gerlach, Jr. et al. | 395/600 |
| 5,353,391 | 10/1994 | Cohen et al. | 395/125 |
| 5,359,712 | 10/1994 | Cohen et al. | 395/161 |
| 5,388,197 | 2/1995 | Rayner | 395/154 |
| 5,519,828 | 5/1996 | Rayner | 395/161 |

OTHER PUBLICATIONS

Fraser et al., The nuts and bolts of Video F/X. (Digital F/X Inc.'s desktop video–editing system), MacWeek, V4 N35 p36(3), Oct. 1990.

"MediaMaker Makes Mac Move", Murie, Michael D., MacWeek, Mar. 26 1991, V5, n12, p. 53.

"QuickTime to Bring Dynamic Dimension to Macs", Karraker, Roger, MacWeek, Aug. 6 1991, V5 n27, p. 50.

"Macromind's MediaMaker to Make Expo Debut", Gugliemo, Connie, MacWeek, Jul. 31, 1990, V4 n26, p. 14.

"Will Picons, Micons or Dicons Supercede Icons?," Rosenthal, Steve, MacWeek, Sep. 26, 1989, V3 n34, p. 32.

Manual entitled "Adobe Premiere™ User Guide–Macintosh Version," Sep. 1991 (94 pages).

Krieg, "Multimedia Computers and the Future of Film/Video Editing," Fernseh–und Kino–Technik, vol. 45, No. 5, pp. 252–254; 256 and 258 (1991) (with English translation).

Klingler et al., "Fusion of Digital Image Processing and Video on the Desktop," pp. 64–66, Digest of Papers, COMPCON, 37th IEEE Computer Society Int. Conference (Feb. 1992).

METHOD AND APPARATUS FOR VIDEO EDITING WITH VIDEO CLIP REPRESENTATIONS DISPLAYED ALONG A TIME LINE

FIELD OF THE INVENTION

The invention is a computer-implemented video editing method and apparatus in which stored video clips are displayed, and an edited video program is assembled from selected ones of the clips. The apparatus of the invention is a computer system programmed to perform video editing operations in response to manipulation of displayed menus and icons.

BACKGROUND OF THE INVENTION

Throughout this specification, the term "video clip" will denote one or more consecutive frames of video data, the term "still image clip" will denote data representing one or more identical frames of still image data (or text), and the term "audio clip" will denote audio soundtrack data corresponding to one or more video clips. A video clip (or a still image clip) can be a scene of an edited video program.

Throughout this specification, the expression "display of a clip" and denotes display (at a single time) of a representation of the data defining the clip, unless qualified to read "sequential display of a clip". Similarly, "displayed clip" denotes a simultaneously displayed representation of the data defining the clip, unless qualified to read "sequentially displayed clip". The expressions "sequential display" of a program, "sequential display" of a clip, and variations on these expressions, denote the non-simultaneous (time-sequential) display of a sequence of representations of data sets, where the data sets collectively define a program or clip.

Throughout this specification, including in the claims, the expressions "edited video program," "video program," and "program" are used interchangeably to denote a sequence of video clips or still image clips (or video clips and still image clips), a transition between each pair of consecutive video and/or still image clips, and optionally also a sequence of audio clips. Each of the transitions between video (and/or still image) clips can be a simple "cut," in which the last frame of a first clip is concatenated with the first frame of a second clip. Alternatively, one or more of the transitions can be a more complicated (special effect) transition, such as a wipe, fade, or dissolve. For example, an edited program can consist of a first video clip, followed by a simple cut to a second video clip, followed by a dissolve transition to a third video clip.

Typically, an edited video program consists of a sequence of video and still image clips (with special effect transitions between consecutive pairs of these clips), and two or more sequences of audio clips (for example, two sequences of audio clips representing left and right channels of an audio soundtrack).

It is conventional to define an edited video program by employing a programmed computer to perform video editing operations in which the computer processes stored digital data representing segments of the video program. A conventional system of this type is disclosed in U.S. Pat. No. 4,538,188, issued Aug. 27, 1990, to Barker, et al. The system of U.S. Pat. No. 4,538,188 employs a computer to control the display and manipulation of pictorial labels (or label pairs), each representing an unedited video segment (or transition between consecutive video segments), in order to assemble an edited video program from unedited video segments. The system also assembles (from the unedited video segments) and displays a sequence of the pictorial labels, which represent scenes (and transitions between scenes) of the edited program. The video segments are stored on video tape, as is the assembled video program. The system has controls which enable a user to specify a variety of transitions between consecutive video segments.

Other video editing systems have been proposed which include means for storing unedited video clips (on video tape or laser video disks), and computer means for controlling the display of selected unedited video clips (or frames of video clips) and generating an edit list in response to user-entered commands.

For example, U.S. Pat. 4,746,994 (issued May 24, 1988, to Ettlinger) discloses a computer-based video editing system in which unedited clips are stored on video tape recorders or video disk players. A computer system enables the user to control the video tape recorders and generate an edit list. The computer system displays a sequence of menus which prompt the user to perform various editing operations (such as displaying desired frames of the unedited clips, shuttling frame-by-frame through a stored unedited clip, adding edits to an edit list, and playing back the sequence of clips defined by the edit list). The user may select various ones of the editing operations by actuating a light pen.

For another example, U.S. Pat. 4,754,342 (issued Jun. 28, 1988, to Duffy) discloses a computer-based video editing system in which unedited clips are stored on video disk players. After generating an edit list, the user may command the system to splice clips in accordance with the edit list and play back an edited show. By using a control console with control buttons and a control dial, the user may command the system to display individual frames of the stored clips, or "roll" one or more clips (or an edited sequence of clips) in forward or reverse motion, at any of a variety of speeds.

SUMMARY OF THE INVENTION

The invention is a method and apparatus for video editing, in which video clips (and optionally also still image clips and audio clips) are stored as digital data in a computer memory, selected clips are displayed in elongated windows (known as "tracks") on a display screen, and editing operations are performed on the clips in response to manipulation of displayed cursors and icons to assemble and preview an edited video program.

The preferred embodiment of the inventive apparatus is a computer system programmed to display representations of video, still image, and audio clips at desired positions along a displayed time ruler, in tracks of a construction window. The system dynamically generates each video clip to be displayed by retrieving from storage all frames of the video clip (or every "Nth" frame of the stored clip in accordance with a user-selected time compression factor), and displaying the retrieved frames.

Animated "special effect" icons, each representing a special effect, are displayed in a separate special effects track also oriented parallel to the time ruler. Each special effect icon can represent a special effect transition between two clips (such as a dissolve, fade, and wipe).

The user instructs the computer to assemble a video program from the stored video clips (and optionally also stored audio clips and clips representing still image images or text) by arranging displayed clips and displayed special effect icons in a desired sequence along the time ruler.

In a preferred embodiment, the computer system of the invention is programmed to perform the following operations:

1. select a new "in" point, "out" point, or both, for a displayed clip (in the edited video program) in response to the positioning of a cursor at an edge of the displayed clip and manipulation of an input device to "drag" the edge along the time ruler;

2. select a special effect transition between a pair of video clips displayed in first and second parallel tracks (and having overlapping portions along the time ruler), by displaying a selected transition icon in a third parallel track in alignment with the overlapping portions of the video clips;

3. select special effect transition parameters (such as transition duration) by displaying a transition icon in a special effects track (where the special effects track is displayed below a first video track and above a second video track, and where overlapping video clips are displayed in the first and second video tracks), and positioning a cursor over the transition icon while manipulating an input device;

4. control superimposition of an overlay clip (representing video, still image, or text) with a main (video or still image) clip by displaying the clips in separate tracks, displaying a level control icon in alignment with the overlay clip, and manipulating the level control icon to display a graph representing a time-varying weighting function for combining the main and overlay clips;

5. preview a video program defined by clips displayed in a desired sequence along a time ruler of a construction window by retrieving the clips from memory, processing the retrieved clips (for example, in accordance with special effects transitions defined by transition icons displayed along the time ruler), and sequentially displaying the processed clips as a preview in a separate video window;

6. cache (in random access cache memory) all frames retrieved in response to a command to update a displayed window or to preview a program defined by clips displayed in a desired sequence along a time ruler of a construction window;

7. process one or more selected video clips by filtering the corresponding digital video data with a temporally varying mosaic filter (having user-selected time-varying filter characteristics); and 8. perform special effects processing by filling the alpha channel of a first clip with a first value (i.e., a hexadecimal "00"), filling the alpha channel of a second clip with a second value (i.e., a hexadecimal "1F"), performing a first special effect process in which selected pixels from the first clip are combined with selected pixels of the second clip to generate a processed clip, and processing alpha channel data of the processed clip to identify one or more edges of the processed clip (for example, to facilitate further special effect processing of the processed clip).

DETAILED DESCRIPTION OF THE PREFERRED EMBODIMENT

Figure 1:
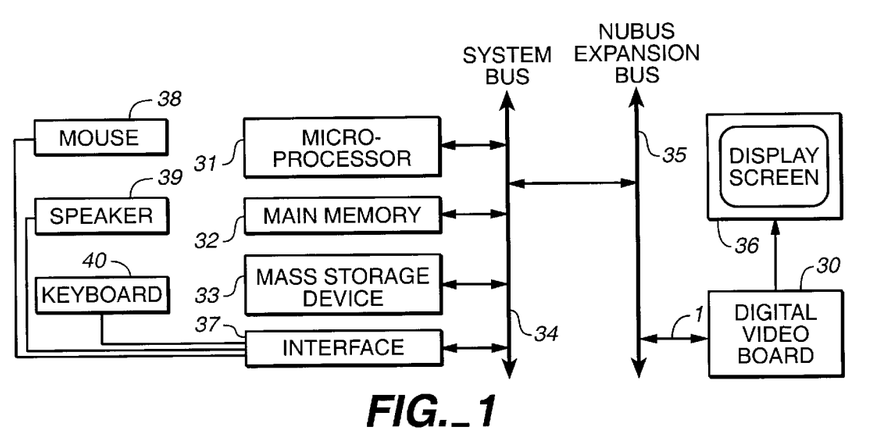
FIG. 1 is a preferred embodiment of the inventive apparatus.

With reference to FIG. 1, a preferred embodiment of the invention includes programmed microprocessor 31, main memory 32 (a random access memory), mass storage device 33, and interface 37, all connected along a system bus 34, and mouse 38, audio speaker 39, and computer keyboard 40 connected to interface 37.

Expansion bus 35 is connected to system bus 34, and digital video board 30 and computer monitor 36 (having a display screen) are connected along expansion bus 35. Microprocessor 31 runs the operating system and applications software that controls the operation of digital video board 30 (and the other system components). Preferably, this software includes Apple QuickTime system extension software available from Apple Computer, Inc. (or software equivalent thereto) for integrating video and audio data into Macintosh applications.

Appropriately programmed microprocessor 31 performs all necessary digital processing operations (including special effects processing and filtering, including mosaic filtering to be described below) on data sets received from memory 32 or 33. Board 30 drives monitor 36, to display (in windows on the monitor's screen) data transferred to bus 35 from system bus 34 after undergoing special effects processing, filtering, or other processing in microprocessor 31. Preferably, board 30 processes 24-bit color video data for display on monitor 36, and microprocessor 31 has 32-bit addressing capability identical or equivalent to that of the Apple System 7 product available from Apple Computer, Inc.

Main memory 32 stores the program and data sets for microprocessor 31, and preferably has at least eight megabyte capacity. Microprocessor 31 and main memory 32 are preferably implemented as a Macintosh™ II (or later model) computer having at least eight megabytes of random-access memory.

Mass storage device 33 is typically a hard disk (preferably having at least 80 megabyte capacity), but can alternatively be a magneto-optical disk or other read/write device, or (in some embodiments) a read-only device such as a CD ROM.

Microprocessor 31 and mass storage device 33 communicate with each other (and with main memory 32) over system bus 34. Bus 34 also allows data communication to expansion bus 35. In the Apple Macintosh™ II family of personal computers, expansion bus 35 adheres to the NuBus standard. Additional information on NuBus operation is available from Texas Instruments, Dallas, Tex.

Additional details regarding preferred embodiments of hardware (and software) for implementing the invention are set forth in the "Adobe Premiere™ User Guide- Macintosh™ Version," dated September 1991, available from Adobe Systems Incorporated, which document is incorporated herein by reference.

Microprocessor 31 is programmed with editing software and user interface software (to be described below). The user interface software accesses the editing software (and the other system software) in response to commands entered by the user using mouse 38 or keyboard 40, and is capable of instructing board 30 to generate displays of the type shown in FIGS. 2–14 on computer monitor 36.

Digital data representing video clips, still image clips, and audio clips are stored in mass storage device 33. Microprocessor 31 "caches" selected portions of this data, including frames of data selected for display on monitor 36, by copying the data into random access memory 32 (which will sometimes be denoted herein as a "cache" memory).

Figure 2:
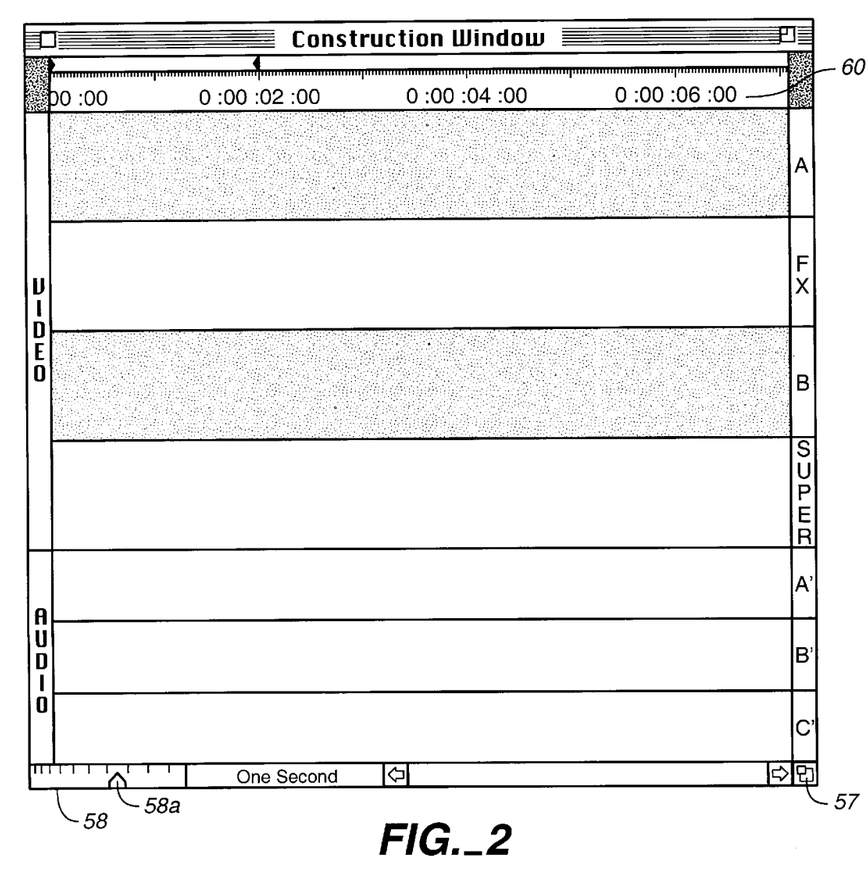
FIG. 2 is a construction window displayed by a preferred embodiment of the inventive apparatus.
Figure 4:
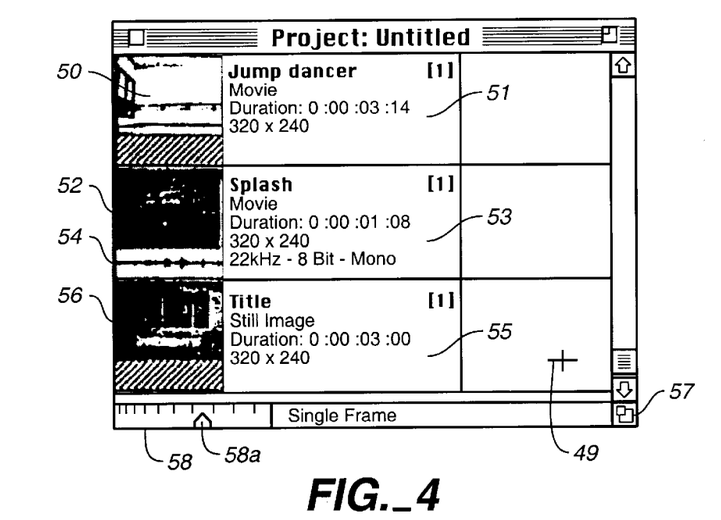
FIG. 4 is a project window displayed by a preferred embodiment of the inventive apparatus.

When a user initiates an editing project, the system opens, and displays on monitor 36, a project window (such as that shown in FIG. 4 or FIG. 5) and a construction window (such as that shown in FIG. 2). By manipulating keyboard 40 and/or mouse 38, the user selects stored video clips (and optionally also still image clips and audio clips) from mass storage device 33. In response to selection of each clip, programmed microprocessor 31 generates an image ("thumbnail") for the clip, and displays the thumbnail (and corresponding identifying text) in the project window. FIG. 4 shows four such thumbnails 50, 52, 54, and 56 displayed in a project window. FIG. 4 also shows identifying text 51 for a video clip having thumbnail 50, identifying text 53 for a video clip having thumbnail 52 (and a corresponding audio clip having thumbnail 54), and identifying text 55 for a still image clip having thumbnail 56. The identifying text preferably includes the size in pixels (i.e., 320 pixels×240 pixels) of each video or still image clip, and the clip duration (in the SMPTE format "hours:minutes:seconds:frames").

The thumbnail for a video clip is (in a preferred embodiment) one (possibly reduced) displayed frame thereof, such as thumbnail 50 and 52 in FIG. 4. For a still image clip, the thumbnail is (in a preferred embodiment) the corresponding image (or text), such as thumbnail 56 in FIG. 4. For an audio clip, the thumbnail is (in a preferred embodiment) a graph of a corresponding audio signal waveform, such as thumbnail 56 in FIG. 4.

Figure 5:
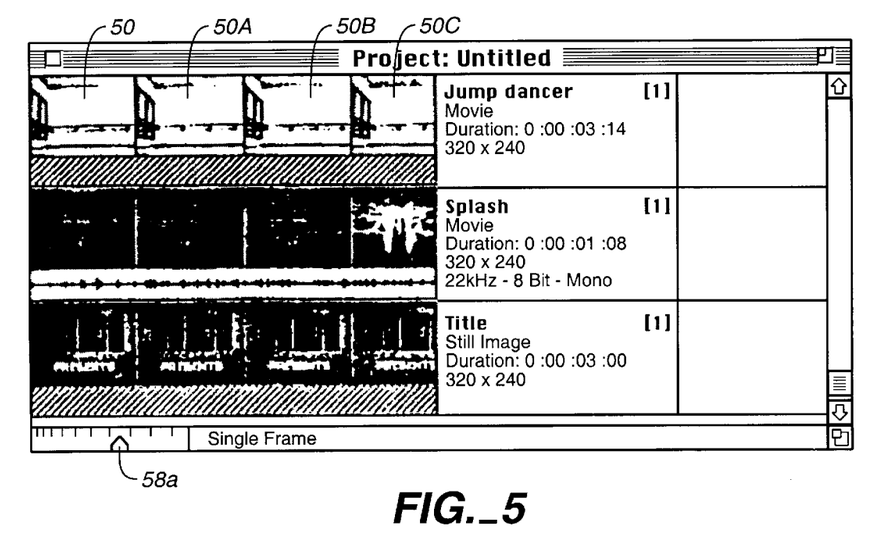
FIG. 5 is another project window displayed by a preferred embodiment of the inventive apparatus.

Preferably, the system is programmed to enable a user to enlarge the project window by manipulating mouse 38 to position cursor 49 on size icon 57, and then dragging size icon 57 toward the right (on the screen of monitor 36). In response to enlargement of the project window, the system will display thumbnails representing additional frames of each previously selected video clip (each of which already has a thumbnail displayed in the project window). For example, FIG. 5 shows an enlarged version of the FIG. 4 project window, with three additional frames (50A, 50B, and 50C) of the video clip having thumbnail 50. In response to enlargement of the project window, the system will display, side-by-side, additional copies of the thumbnail of each still image clip. For example, in the enlarged project window of FIG. 5, four copies of still image clip thumbnail 56 are displayed.

Preferably, the user can control the time scale on which clips are displayed in the project window (i.e., the degree of time compression with which a video clip is displayed in the project window). This can be done by positioning cursor 49 on a "time unit" icon 58a in time compression window 58 and dragging icon 58a to a different station within window 58 (by manipulating mouse 38). Preferably, icon 58a can be positioned at any of several stations, each representing a different time scale (and time compression factor). Examples of such stations include: "single frame" (for displaying each frame of a video clip, i.e., one frame for each 1/30 second segment of a video clip representing video data having a frame rate of 30 per second), "two frames" (one displayed frame for each two frames of a video clip), "one second" (one displayed frame for each segment of a video clip having 1 second duration), and "two minutes" (one displayed frame for each segment of a video clip having 2 minute duration).

In general, the system responds to any command requiring display of a video clip in a window (which can be a preview window, or a construction window of the type to be described below) by retrieving from storage, caching, and displaying every "Nth" frame of the selected video clip. The factor "N" is determined by the currently selected time compression factor. For example, if the user has selected the above-described "one second" time compression factor, the factor N equals 30, and the system will display every 30th frame of a selected video clip (if the clip has a frame rate of 30 frames per second).

For another example, in response to selection of a stored video clip from mass storage device 33 for inclusion in a project (and display in the project window) with time unit icon 58a at a "single frame" station in time compression window 58, the system will display in the project window as many frames of the clip as will fit in the currently configured project window, and will cache all the displayed frames in cache memory 32. If the user then enlarges the project window, the system will retrieve a larger subset of the clip's frames from cache memory 32 (and mass storage memory 33), display this larger subset of frames in the enlarged project window, and cache the displayed frames in cache memory 32.

For another example, in response to selection of a stored video clip from mass storage device 33 for inclusion in a project with time unit icon 58a at a "two frames" station in window 58, the system will display in the project window as many frames of the time-compressed clip as will fit in the currently configured project window (i.e., only the first, third, and fifth frames, if only three frames will fit in the project window), and will cache the displayed frames in cache memory 32. If the user then enlarges the project window, the system will retrieve a larger subset of the time-compressed clip's frames from cache memory 32 (and mass storage memory 33), display this larger subset of frames in the enlarged project window, and cache the displayed frames in cache memory 32.

To generate an edited video program, the user drags thumbnails of selected clips from the project window to a construction window of the type shown in FIG. 2 (by manipulating mouse 38), and moves the thumbnails into a desired arrangement in the construction window. The construction window displays a time ruler 60 in a timeline window along its top edge, and elongated windows ("tracks") oriented parallel to time ruler 60. FIG. 2 shows seven tracks, labeled "A," "Fx," "B," "Super," "A'," "B'," and "C'," respectively.

Because the thumbnails displayed in tracks of the construction window represent entire video clips or time-compressed entire video clips, the following description of the construction window (with reference to FIGS. 2–3 and 6–11) will refer to thumbnails displayed in tracks of the construction window as "clips."

Time ruler 60 represents the timeline of the edited video program. The user can expand the construction window by dragging size icon 57 (in the same manner described above with reference to identical icon 57 of the project window). Because a complete edited program may have duration longer than can be represented by clips displayed on a single monitor screen, the system permits the user to display any selected portion of program in the construction window. For example, the user can instruct the system to display the clips for a first portion of the program in a construction window (with the construction window displaying a first portion of time ruler 60 extending from the program start time 0:00:00 to intermediate time M:MM:MM), and thereafter instruct the system to display the clips for the remaining portion of the program in the construction window (with the construction window displaying the remaining portion of time ruler 60 extending from time M:MM:MM to a program end time N:NN:NN).

When clips have been arranged in the construction window along time rule 60, the user can enter a "preview" command to microprocessor 31 to cause the system to generate a video program defined by the displayed clips. The manner in which the system responds to a "preview command" will be more fully described below, but can be summarized as follows: the system retrieves from mass storage memory 33 (or cache memory 32) all data corresponding to the displayed clips, stores the retrieved frames in cache memory 32, and displays the cached frames sequentially (as full-motion video) in a window on the screen of monitor 36 (and optionally also plays the corresponding audio soundtrack channels on speakers).

In the preferred embodiment shown in FIG. 2, the construction window has seven tracks, all oriented parallel to time ruler 60. Only audio clips can be displayed in the bottom three tracks (identified as tracks A', B', and C'), and only video or still image clips can be displayed in the top four tracks (identified as tracks A, FX, B, and "Super").

Figure 3:
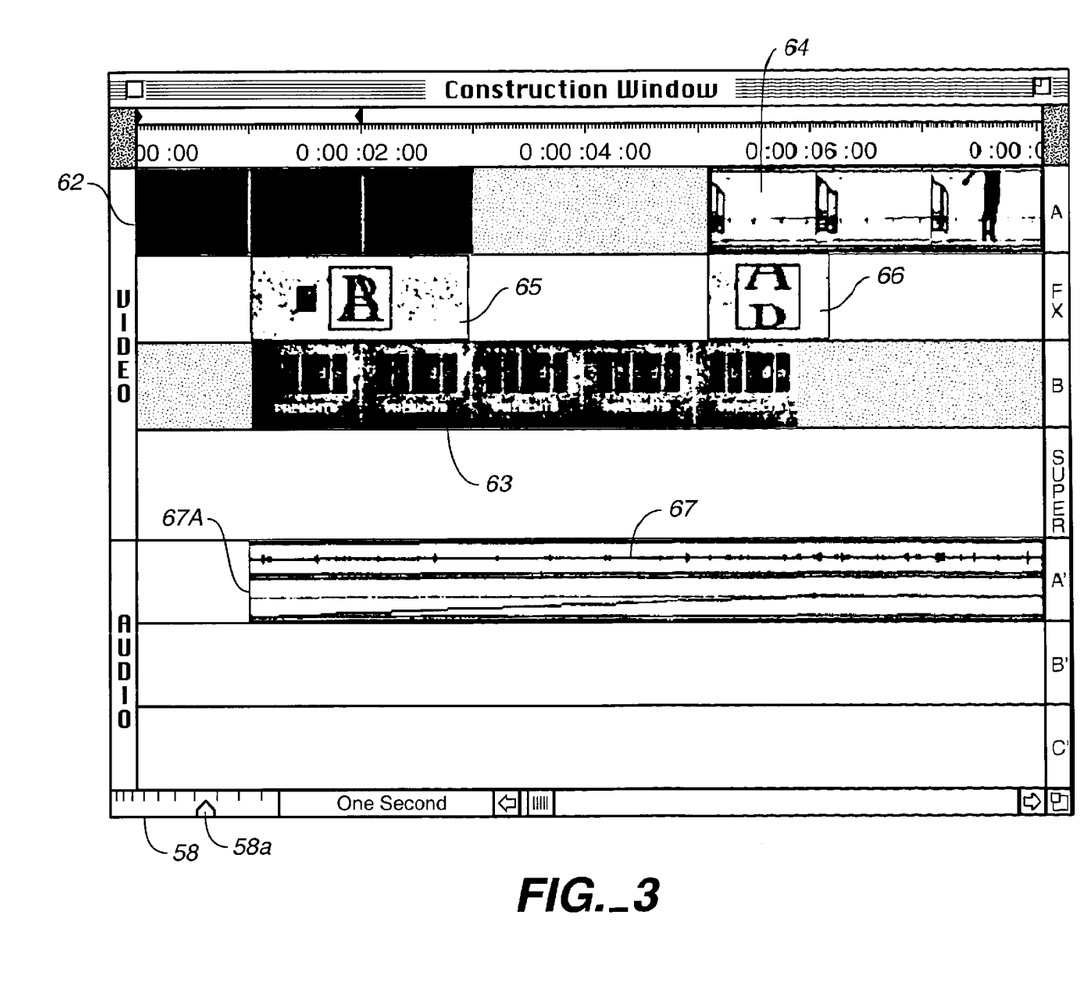
FIG. 3 is a construction window (of the FIG. 2 type) with two video clips, one still image clip, one audio clip, and two special effect transition icons displayed in separate tracks thereof.

The large tick marks of time ruler 60 represent the time scale for the video program (with time displayed in SMPTE format), and the small tick marks represent frames or seconds (depending on the currently selected time scale). The user selects a time scale by manipulating icon 58a in window 58 (shown in FIG. 2) in the same manner as described above with reference to identical icon 58a and window 58 of the project window of FIG. 4. As described above with reference to FIG. 4, icon 58a preferably can be positioned at any of several stations, each representing a different time scale (including, for example, "single frame," "two frames," "one second," and "two minutes" stations). For example, if the user drags a video clip into the construction window with time unit icon 58a positioned at a "one second" station in window 58 (as shown in FIG. 3), the system will cache (in cache memory 32) a time-compressed version of the video clip (i.e., it will cache one frame of the clip for each one-second segment of the clip). The system will also display all frames of the time-compressed clip in one track of the construction window (with one displayed frame per "one second" interval along time ruler 60), and will display a version of time ruler 60 scaled for the selected "one second" time scale (having small tick marks representing frames between each pair of large tick marks, with the distance between each pair of large tick marks representing one second).

A very simple edited video program is defined by video (and/or still image) clips arranged side-by-side in a single track (i.e., track A), with the "Out" point (right edge) of each clip butting against the "In" point (left edge) of the next clip, and with no audio clips displayed in audio tracks A', B', and C'. In response to entry of a "preview" command with this arrangement of clips displayed in the construction window, the system previews the program by sequentially displaying (in a preview window) the clips that are simultaneously displayed in the construction window, in a time order corresponding to the spatial position of the clips along time ruler 60.

To generate more complicated video programs (with overlapping clips), the user displays pairs of overlapping clips in different tracks of the construction window (as shown in FIG. 3).

With reference to FIG. 3, the user can specify a special effects transition between video clip 62 and still image clip 63 by positioning clip 62 in track A and clip 63 in track B, and positioning a special effect transition icon 65 in a track FX. The user adjusts "In" and "Out" points of icon 65 (the left and right edges of icon 65, respectively) so that icon 65 coincides with the overlapping portions of clips 62 and 63 along time ruler 60. Because icon 65 represents a cross-dissolve transition (to be described below), the FIG. 3 display specifies a video program including a cross dissolve transition from clip 62 to clip 63, beginning at the "In" point of icon 65 and ending at the "Out" point of icon 65.

FIG. 3 also shows a "push" special effect transition icon 66 in track FX, in alignment with overlapping portions of video clip 64 (in track A) and still image clip 63 (in track B). Because icon 66 represents a push transition (to be described below), the FIG. 3 display specifies a video program including a "push" transition from clip 63 to clip 64, beginning at the "In" point of icon 66 and ending at the "Out" point of icon 66.

FIG. 3 also shows audio clip 67 in audio track A', which represents a single-channel (monaural) audio soundtrack. Because the "In" point (left edge) of audio clip 67 is aligned with the "In" point of clip 63, the soundtrack for the program will commence simultaneously with the start of the cross-dissolve from clip 62 to clip 63, and the soundtrack will continue during display of clips 63 and 64. Optionally, the user could add second and third audio clips to tracks B' and C' to specify a three-channel audio soundtrack (which might correspond to left and right stereo channels, and a "surround" or "sub-woofer" channel).

Figure 8:
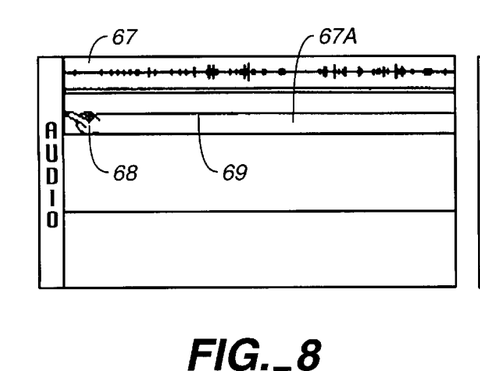
FIG. 8 is a portion of a construction window having a single audio clip displayed in one audio track, generated in an embodiment of the invention.
Figure 9:
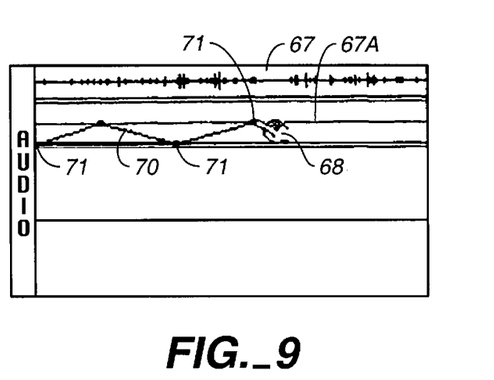
FIG. 9 is a modified version of the FIG. 8 display, which is produced by altering the level control icon of the FIG. 8 display, in an embodiment of the invention.

The system is programmed so that manipulation of audio level control icon 67A (displayed with clip 67 in track A') allows the user to adjust the level of the corresponding audio track, in the same way that sound is mixed in record and television production. With reference to FIGS. 8 and 9, the user positions a pointer (cursor) 68 on middle line 69 of icon 67A (by manipulating mouse 38). The user then "clicks" mouse 38 (activates a control on mouse 38) to create a handle 71 (a black dot), and drags 71 handle up or down relative to line 69 to program the system to execute an audio clip fade in or fade out, respectively, and to deform a displayed "rubber-band" level control line 70. The default position of rubber-band line 70 is a position coincident with middle line 69, which represents a mid-range audio level for clip 67. Line 70 has "rubber-band" characteristics in the sense that, in response to a user's dragging of a handle 71 vertically at one position along time ruler 60, the system automatically deforms line 70 along part of its length in accordance with a model in which the portion of line 70 to the left of the handle simulates an elastic band (to provide for smooth temporal variations in audio level assigned to consecutive segments of audio clip 67). Thus, if the user drags a handle 71 downward from the position of pointer 68 in FIG. 9, the system automatically moves downward a portion of line 70 on the left side of pointer 68, as if that portion of line 70 were made of elastic material.

The user can create as many handles 71 as desired (three handles 71 are indicated in FIG. 9). Each ascending portion of line 70 represents a fade in, and each descending portion of trace 70 represents a fade out. In response to entry of a preview command, the system retrieves from storage the audio data for audio clip 67 and plays the audio clip through a speaker (such as speaker 39 of FIG. 1), with an instantaneous volume level determined by the position of line 70 relative to line 69 at the corresponding position along time ruler 60.

Figure 10:
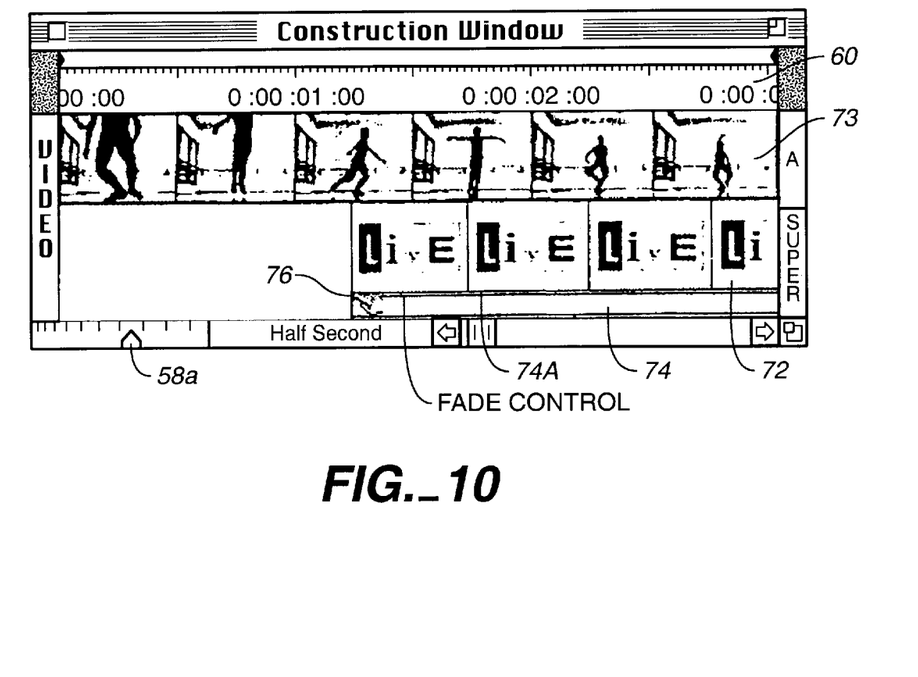
FIG. 10 is a construction window displayed by a preferred embodiment of the inventive apparatus, with a video clip and an overlay clip displayed in separate tracks.
Figure 11:
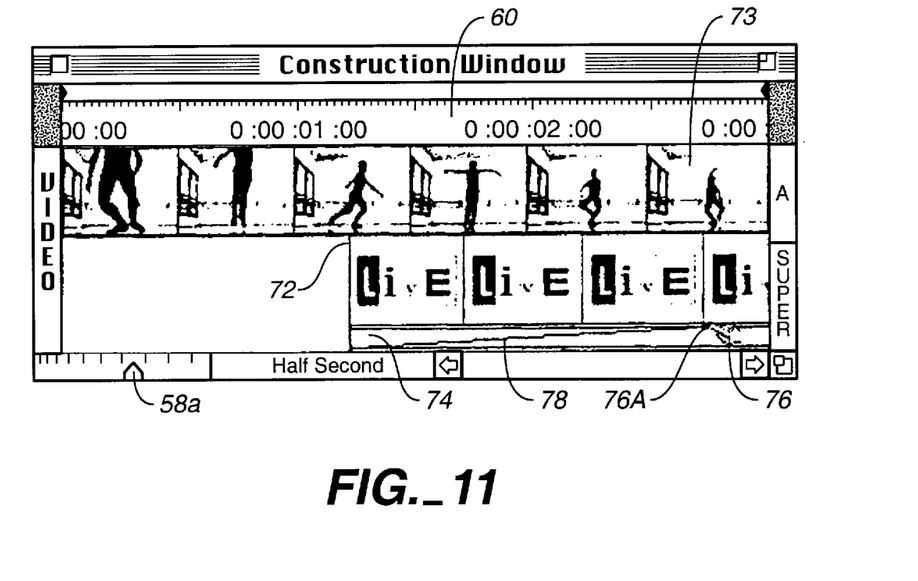
FIG. 11 is a modified version of the FIG. 10 display, which is produced by altering the level control icon of the FIG. 10 display.

Next, with reference to FIGS. 2, 10, and 11, another way will be described in which a user can control superimposition of overlapping video (or still frame image) clips displayed in the construction window. To accomplish this, the system is programmed to superimpose a clip displayed in the "Superimpose" track (identified by label "Super" in FIGS. 2, 10, and 11) with a clip displayed (along the same segment of time ruler 60) in track A or B, or with overlapping clips displayed in tracks A and B. When the system generates and previews the corresponding program, the images corresponding to the clips in tracks A or B (or both A and B) shows through transparent parts of the superimposed image.

To superimpose a video or still image clip (referred to as an "overlay" clip) with a clip (referred to as a "main" clip) displayed in track A, B, or both A and B, the user drags the overlay clip to the "Super" track, and aligns it with the relevant portion of the clip in track A. For example, FIGS. 10 and 11 show a main clip 70 in track A and an overlay clip 72 in a "Super" track. The construction window of FIGS. 10 and 11 has been reconfigured to delete tracks B and FX. In a preferred embodiment, the user can reconfigure the construction window of FIGS. 10 and 11 to add tracks B and FX of the type shown in FIG. 2.

The user specifies which portions of the overlay clip are transparent, in one of two ways. In one alternative, the user specifies a color (or range of colors) of the overlay clip as being transparent (so that the main clip will show through portions of the overlay clip having the specified color or range of colors). This can be done by displaying a transparency setting menu having icons which can be manipulated using mouse 38 to specify the "transparent" color or range. In another alternative, the overlay clip includes a special "alpha" channel, comprising bits which define a grey scale level for each pixel of each frame of the overlay clip. In this case, the system can be programmed to interpret the grey scale levels as degrees of transparency. An example of a clip having such an alpha channel is a clip consisting of 32-bit, still image frames generated by the "Photoshop" software commercially available from Adobe Systems Incorporated.

It is often desirable to generate an edited program having a title (or other overlay image) which fades in or out, or has a semi-translucent appearance, when superimposed on a main image. In a preferred embodiment, the system of the invention is programmed to enable the user to achieve such effects in a convenient, intuitive manner. This is accomplished by manipulating a level control icon, such as fade control bar 74 displayed in the "Super" track of FIGS. 10 and 11. To adjust how "strongly" the overlay image will be displayed on the main image (or in other words, to adjust the weight with which overlay clip 72 is combined with main clip 73), the user manipulates mouse 38 to position a pointer 76 on top (horizontal) line 74A of fade control bar 74. The user then "clicks" mouse 38 to display a handle 76A (a black dot), and drags handle 76A up or down within fade control bar 74 to deform a displayed "rubber-band" level control line 78. The default position of rubber-band line 78 is a position coincident with top line 74A, which represents maximum weight for overlay clip 72. If the user drags handle 76A downward (upward), the system assigns decreased (increased) weight to the corresponding segment of the overlay clip. With handle 76A at the bottom of icon 74, the corresponding overlay image will be completely non-visible when superimposed on the corresponding segment of main clip 73.

Line 78 has "rubber-band" characteristics in the sense that, in response to a user's dragging of handle 76A vertically at one position along time ruler 60, the system automatically deforms line 78 along part of its length in accordance with a model in which the portion of line 78 to the left of the handle simulates an elastic band (to provide for smooth temporal variations in the weight assigned to consecutive segments of overlay clip 72). Thus, if the user drags handle 76A downward from the position shown in FIG. 11, the system automatically moves downward a portion of line 78 on the left side of handle 76A, as if that portion of line 78 were made of elastic material.

One advantage of the invention is that it provides a convenient and intuitive way for a user to select "In" and "Out" points for each clip to be included in an edited video program. In contrast, prior art editing systems accomplish this function in an inconvenient manner, in which the user views sequentially displayed video frames, freezes the sequential display at a desired frame, and marks the frame as an "In" or "Out" point of a video segment. This prior art technique makes it very difficult for a user to perform many routine editing operations, such as extending a video segment to match certain actions in another video segment (or to match a desired portion of an audio soundtrack).

The inventive system is preferably programmed to enable a user to select "In" and "Out" points for each clip of a video program, in the manner to be described next with reference to FIGS. 6 and 7. To align a clip along time ruler 60, the clip is displayed in a track of the construction window, and the left or right edge of the clip is dragged along the track to a desired "In" or "Out" point along the time ruler 60. The precision with which each edge can be positioned along time ruler 60 depends on the currently selected time scale for the construction window (the time scale is selected, in the manner explained above, by manipulating icon 58). To align clips with maximum precision, the time unit should be selected to have its lowest value (i.e., icon 58 configured in the "single frame" setting, in which each frame of the clip is displayed in the construction window).

Figure 6:
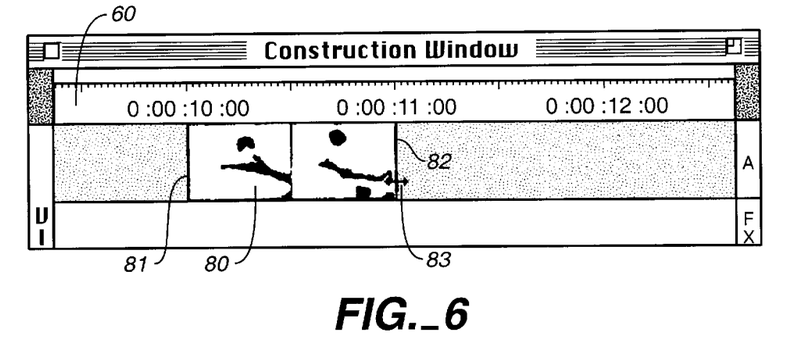
FIG. 6 is a portion of a construction window having a single video clip displayed in one video track, generated in an embodiment of the invention.
Figure 7:
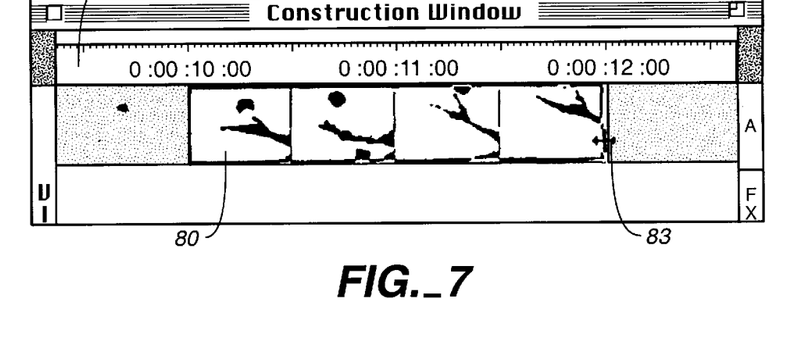
FIG. 7 is a modified version of the FIG. 6 display, which is produced by dragging the right edge of the video clip of FIG. 6, in an embodiment of the invention.

As shown in FIG. 6, left edge 81 of clip 80 is aligned at SMPTE time code 0:00:10:00 of time ruler 60, indicating that clip 80 commences (i.e., has an "In" point) at the tenth second of the video program being edited. Right edge 82 of clip 80 is aligned at SMPTE time code 0:00:11:00 of time ruler 60, indicating that clip 80 ends at the eleventh second of the video program. To maintain this "In" point for clip 80, and insert a longer-duration version of clip 80 into the video program, the user positions a "stretch" cursor 83 at right edge 82 of clip 80 (as shown in FIG. 6). The user then "grabs" edge 82 by manipulating a control on mouse 38 and drags edge 82 toward the right along time ruler 60. When edge reaches the desired new "Out" point along ruler 60 (i.e., the point marked with SMPTE time code 0:00:12:00, as shown in FIG. 7), the user releases the control on mouse 38. In response to this sequence of operations, the system edits the video program to include a longer version of clip 80 (having the original "In" point and the new "Out" point), and retrieves from memory additional frames of clip 80 for display in the construction window (i.e., the two new frames of clip 80 shown in FIG. 7, but not FIG. 6).

If the user enters the preview command with video clip 80 displayed as shown in FIG. 6, the system would display (in a preview window) all frames of a one-second video segment. If the user enters the preview command with video clip 80 displayed as shown in FIG. 7, the system would display (in the preview window) all frames of a two-second video segment (with the first one-second portion of such two-second segment identical to the segment referred to in the previous sentence).

Similarly, the user can set a new "In" point for a clip by dragging the clip's left edge, along a track in the construction window, with the stretch icon.

Also similarly, microprocessor 31 is preferably programmed to enable a user to split a clip into two new clips (which can be independently resized and repositioned along time ruler 60) by positioning a "razor blade" cursor at desired position along the time ruler and manipulating a control on mouse 38 to define this desired position as the "Out" point of the first new clip and the "In" point of the second new clip.

Microprocessor 31 is preferably programmed to enable a user to select a special effect transition icon, in the following manner, for display in the above-described "FX" track of the construction window. In response to a command from the user, microprocessor 31 causes a special effects menu (such as the menu shown in FIG. 12) to be displayed in a window on monitor 36. The special effects menu includes a set of transition icons, each which can be selected by positioning a cursor thereon using a mouse.

Figure 12:
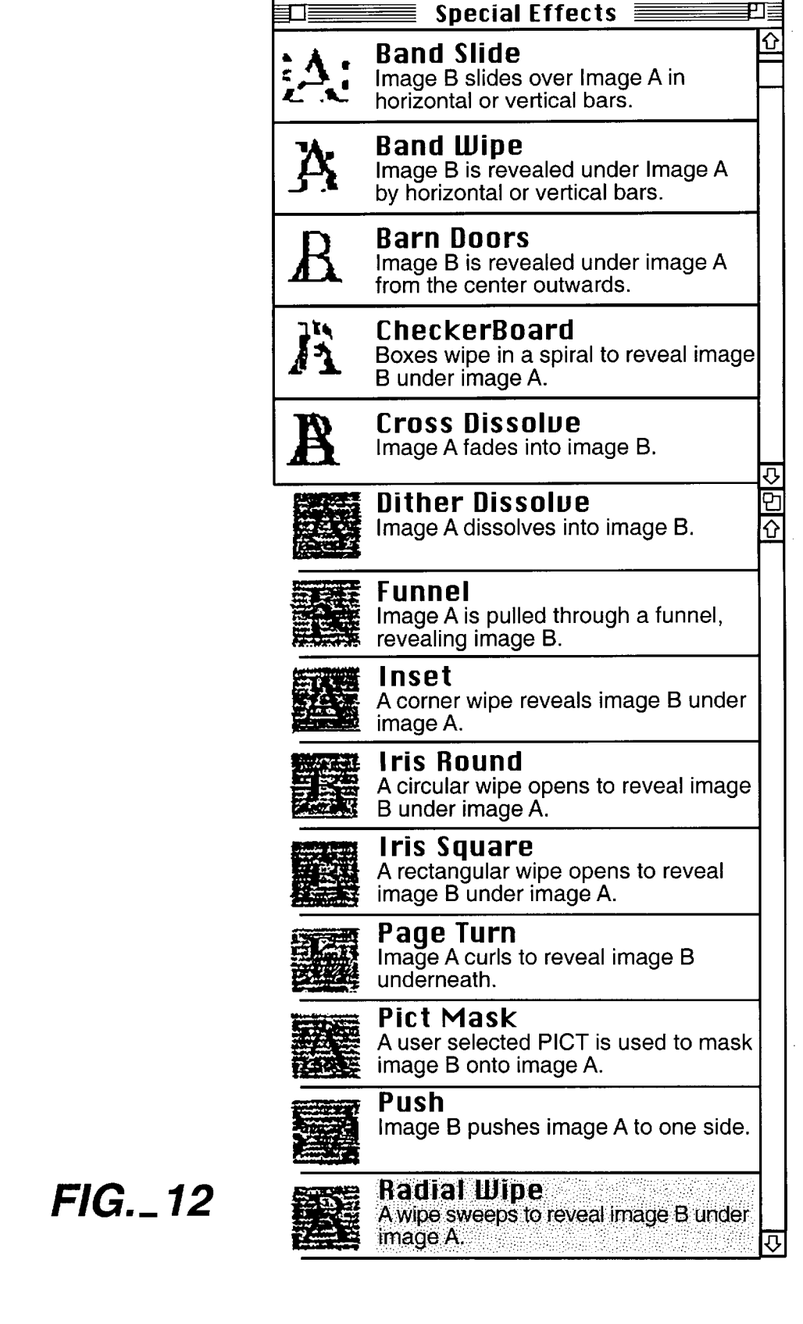
FIG. 12 is a special effects menu displayed by a preferred embodiment of the inventive apparatus, including a set of animated special effect transition icons.

Each transition icon represents a different special effect transition between two clips: an "A" clip (displayed in track A of the construction window, and associated with an "A" image); and a "B" clip (displayed in track B of the construction window, and associated with a "B" image). The following fourteen transition icons are shown in FIG. 12 (more than or less than fourteen transition icons can be displayed in alternative embodiments of the invention):

a "Band Slide" icon, representing a transition in which the B image appears to slide over the A image in horizontal or vertical bars;

a "Band Wipe" icon, representing a transition in which the B image is revealed under the A image by horizontal or vertical bars;

a "Barn Doors" icon, representing a transition in which the B image is revealed under the A image from the center outwards;

a "Checkerboard" icon, representing a transition in which boxes wipe in a spiral to reveal image B under image A;

a "Cross Dissolve" icon (also shown within icon 65 in FIG. 3), representing a transition in which image A fades into image B;

a "Dither Dissolve" icon, representing a transition in which image A dissolves into image B;

a "Funnel" icon, representing a transition in which the A image is pulled through a funnel, revealing the B image;

an "Inset" icon, representing a transition in which a corner wipe reveals image B under image A;

an "Iris Round" icon, representing a transition in which a circular wipe opens to reveal image B under image A;

an "Iris Square" icon, representing a transition in which a rectangular wipe opens to reveal image B under image A;

a "Page Turn" icon, representing a transition in which image A curls to reveal image B underneath;

a "PICT Mask" icon, representing a transition in which a user selected 1-bit (black and white) image, of the conventional PICT type, and the system replaces the black in the PICT image with image A and the white in the PICT image with image B;

a "Push" icon, representing a transition in which image B appears to push aside image A; and a "Radial Wipe" icon, representing a transition in which a line fixed at one corner of the screen sweeps across image A, revealing image B.

Figure 13:
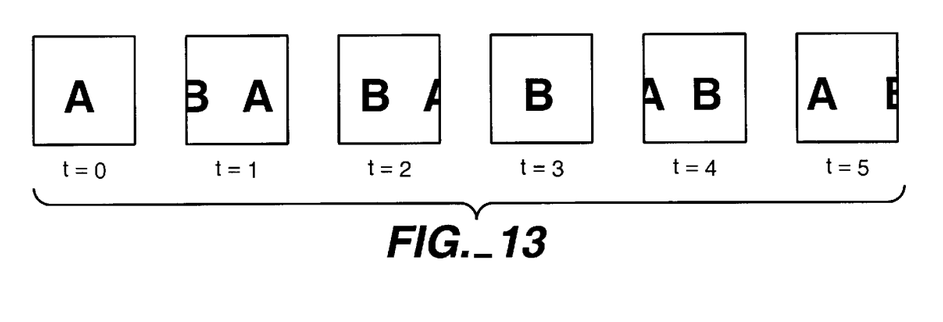
FIG. 13 is a set of six transition icon displays, representing the animated display of a special effect transition icon, generated in an embodiment of the invention.

In response to a command from the user to activate the special effects menu, the system animates each of the transition icons displayed in the special effects menu. For example, FIG. 13 is a set of six transition icon displays, representing the animated display of the "Push" transition icon of FIG. 12. The left-most image of FIG. 12 is displayed at a first time (t=0), followed (in sequence) by the second image from the left, the third image from the left, the fourth image from the left, the fifth image from the left, and the right-most image. After the right-most image is displayed, the animation process repeats, and all six images are sequentially displayed again.

The user includes a special effect transition in the program being edited by selecting a corresponding transition icon from the special effects menu, and dragging the selected transition icon to a desired position along the FX track of the construction window. As described above with reference to FIG. 3, the user adjusts "in" and "out" points of the transition icon in the FX track so that the left edge ("in" point) and right edge ("out" point) of the transition icon are aligned with beginning and end points of a selected overlapping portion of a first clip in track A and a second clip in track B (as transition icon 65 is configured in FIG. 3). In one class of embodiments, the user adjusts in and out points of each transition icon by positioning a cursor on the left or right edge of the icon, and dragging the edge relative to time ruler 60, in the same manner (described above with reference to FIGS. 6 and 7) that a user adjusts "in" and "out" points of a video or still image clip in track A or track B.

In a class of preferred embodiments, each transition icon includes a set of control icons for setting parameters of the corresponding special effect transition (such as the in point, out point, and duration of the transition). Icon 90 of FIG. 15 is an example of a transition icon having such control icons.

Figure 15:
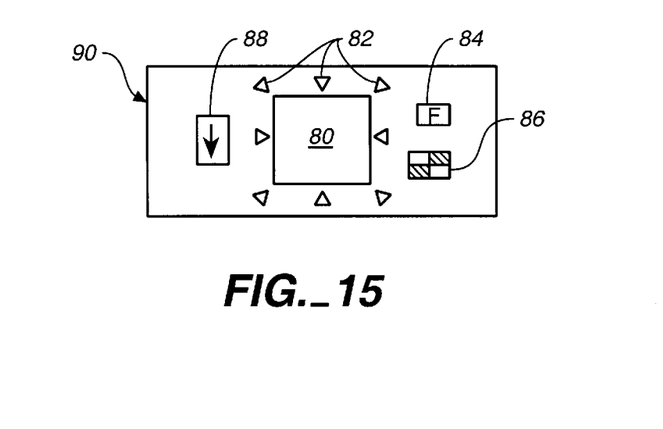
FIG. 15 is a special effect transition icon of a type displayed by a preferred embodiment of the invention.

In FIG. 15, the control icon displayed in area 80 determines the type of the special effect transition. The user determines the type of the transition by dragging a selected icon from a special effects menu (which can be the menu described above with reference to FIG. 12) to area 80.

The user can specify a direction of movement for certain transitions (i.e., the direction on the screen in which one clip "pushes" the other in a "push" transition) by "clicking" mouse 38 to select a desired one of edge control icons 82.

If there are at least two available directions for a transition, the corresponding icon 90 displays one edge control icon 82 for each available position. For example, for a "push" transition (when a "push" icon of the type described with reference to FIG. 13 is displayed in area 80 of icon 90), eight edge control icons 82 may be displayed (as shown in FIG. 15), each representing a different direction in which one of clips A and B will push the other during the transition.

Icon 90 optionally includes track selection control icon 88. The user can specify which clip (as between a clip in track A and an overlapping clip in track B) should play a given role in the transition, by clicking on icon 88 using mouse 38.

Icon 90 optionally also includes forward/reverse control icon 84, and anti-aliasing control icon 86. The user can specify a forward or reverse direction for a transition by clicking on icon 84 using mouse 38. The user can set an anti-aliasing level (i.e., to a "low," "high," or "off" level) by clicking on icon 86 using mouse 38.

An additional feature of a preferred embodiment of the invention will be described next with reference to FIG. 14. In this embodiment, microprocessor 31 is programmed to perform any of a variety of filtering operations on selected clips. The user specifies each filtering operation by displaying a corresponding filter control menu, and setting filtering parameters by manipulating filter control icons displayed on the filter control menu using mouse 38 and/or keyboard 40.

Figure 14:
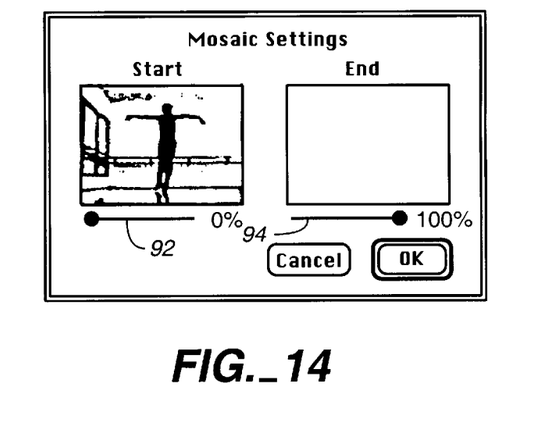
FIG. 14 is a mosaic filter control menu displayed by a preferred embodiment of the invention.

An example of such a filter control menu (for a "mosaic" filter) is shown in FIG. 14. A mosaic filter divides the frames of the displayed clip into a grid of squares, and makes each square the average color of all the pixels within the square. The user can set the effect of the mosaic filter to gradually increase or decrease as the clip plays by adjusting "Start" and "End" control icons displayed in the mosaic filter control menu. By lengthening "Start" control icon 92, the user increases the level of the mosaic filter at the start of the clip (i.e., increases the size of the squares into which the first frame of the clip is divided). Similarly, by lengthening "End" control icon 94, the user increases the level of the mosaic filter at the end of the clip (i.e., increases the size of the squares into which the last frame of the clip is divided). The system is preferably programmed to interpolate the level of the temporally varying mosaic filter for intermediate frames of the clip. When the user has defined a temporally varying mosaic filter for a clip, and then enters the preview command, the system filters the digital data corresponding to each frame of the clip (in accordance with the defined mosaic filter) before displaying the filtered clip in the preview window.

Another feature of a preferred embodiment of the invention will be described next. This feature contemplates that microprocessor 31 can be programmed to execute any of a variety of special effects on selected clips. One preferred way to accomplish this is to program microprocessor 31 with "plug-in" special effect software modules, each of which performs a phase of a more complicated special effect. This feature also contemplates that the frames of digital data to be processed include an alpha channel (i.e., an 8-bit, transparency-scale representation of an image for each frame) associated with color channels (which can comprise three 8-bit color values for each pixel of the frame).

When performing special effects processing (requiring combination of two clips), the programmed microprocessor 31 of the invention preferably fills the alpha channel of the first clip with a first value (i.e., a hexadecimal "00"), fills the alpha channel of the second clip with a second value (i.e., a hexadecimal "1F"), and then performs a first special effect process (i.e., in a plug-in special effect software module) in which selected pixels from the first clip are combined with selected pixels of the second clip to generate a processed clip. Then, when the processed clip undergoes subsequent processing, the alpha channel data of the processed clip is examined to identify one or more edges of the processed clip. For a given pixel, if the pixel's alpha channel matches the alpha channels in the four adjacent pixels (the pixels left, right, above, and below it) then there is no edge at that pixel. If, however, one or more of the alpha channels differs, an edge is determined to exist at that pixel (and any desired operation can be applied at that location, such as colored edge or a smoothing operation).

This technique allows the second plug-in special effect software module (or other software) to identify edges of the processed clip without the need to specifically generate an edge region data structure.

The choice of "00" and "1F" values allows for an additional speed increase in the comparison. Instead of comparison of the alpha channels as described above, the alpha channel values of the five neighboring pixels can be added together as byte sized values. A result of zero or a negative value indicates no edge, while any other value indicates an edge.

Next, the caching steps (briefly described above) implemented by a preferred embodiment of the invention will be more fully described. Data are written into the cache memory (i.e., random access memory 32 of FIG. 15) in response to each user command for updating the construction window, or for previewing a program defined by a currently displayed construction window. An example of the latter type of command is a command to change the time scale of time ruler 60.

In response to each such command, the system calculates the addresses of the data that must be retrieved to update the construction window (or a preview window for previewing the program). The system then searches the cache memory to retrieve therefrom any of the required data currently stored in the cache memory. After retrieving any of the required data currently stored in the cache memory, the system retrieves from its mass storage memory (memory 33 of FIG. 1) the remaining required data. The system then caches all the retrieved data in the cache memory, processes the retrieved data in response to the command, and displays the processed data to update the screen display. As a result of the caching step, the system reduces the memory access time required for responding to future construction window updating or preview commands.

For example, in an embodiment of the invention, in response to a command for previewing a program, microprocessor 31 retrieves all frames of the program (from cache memory or mass storage memory), processes the retrieved frames in accordance with special effects transitions defined by transition icons currently positioned in the construction window (and in accordance with any user-specified filtering operation), and causes the processed frames to be sequentially displayed in a preview window on the screen of monitor 36. The system also caches the retrieved frames (in their unprocessed form).

In preferred embodiment, microprocessor 31 "compresses" each frame to be cached in memory 32, in the sense that it causes only some of the bits of the frame to be cached. For example, if a clip comprises 32-bit digital video data, including an eight-bit alpha channel for each frame of the clip, retrieved frames of the clip may be "compressed" by eliminating the alpha channel before caching the remaining 24-bit digital video data defining each frame. Such an alpha channel can be employed by microprocessor 31 to perform certain special effects processing (described above), and accordingly, such special effects processing must be performed on the retrieved frames before the frames are "compressed."

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for editing a video program which includes a sequence of clips and transitions between the clips, the method comprising the steps of:

(a) displaying a time line;

(b) generating a display representing the video program clips by digitizing and thereafter simultaneously displaying a frame from each of a plurality of the digitized clips on tracks along and in a direct time relationship to the time line the width of the displayed frames representing the time duration of the clip represented by that frame, together with transition icons, the transition icons representing the transitions between the plurality of the digitized clips;

(c) editing the video program by modifying the display.

2. The method of claim 1, wherein step (c) includes the step of:

dynamically generating and displaying the frames in digital form in response to commands for modifying the display.

3. The method of claim 2, wherein each of the frames has a left edge aligned at an in point along the time line and a right edge aligned at an out point along the time line, and wherein step (c) includes the step of:

changing an in point of a first one of the clips by changing a position along the time line of the left edge of the frame representing the first one of the clips.

4. The method of claim 2, wherein each of the has a left edge aligned at an in point along the time line and a right edge aligned at an out point along the time line, and wherein step (c) includes the step of:

changing an out point of one of the clips by changing a position along the time line of the right edge of the frame representing one of the clips.

5. The method of claim 1, wherein a first one of the transition icons is displayed in a special effects track, and has a left edge aligned at an in point along the time line and a right edge aligned at an out point along the time line, and wherein step (c) includes the step of:

changing the in point of the first one of the transition icons by changing a position along the time line of the left edge of said first one of the transition icons.

6. The method of claim 1, wherein a first one of the transition icons is displayed in a special effects track, and has a left edge aligned at an in point along the time line and a right edge aligned at an out point along the time line, and wherein step (c) includes the step of:

changing the out point of the first one of the transition icons by changing a position along the time line of the right edge of said first one of the transition icons.

7. The method of claim 1, wherein step (c) is performed in response to a command for modifying the display, and wherein step (c) includes operations of:

(d) identifying data needed to modify the display in response to the command;

(e) retrieving from a cache memory at least a first portion of the data currently stored in the cache memory;

(f) after step (e), retrieving any remaining portion of the data from a mass storage memory;

(g) processing the data retrieved during steps (e) and (f) to generate processed data for modifying the display in response to the command; and (h) caching the data retrieved during steps (e) and (f) in the cache memory by compressing the data and caching the resulting compressed data in the cache memory.

8. The method of claim 1, wherein the display includes a first frame in digital form displayed on a first track, a second frame in digital form displayed on a second track with an overlap portion of the second frame aligned along the time line with an overlap portion of the first frame, and a transition icon displayed in a third track in alignment with the overlap portion of the second frame.

9. The method of claim 8, wherein the transition icon has an associated control icon, and wherein step (c) includes a step of:

modifying a parameter of a transition in the video program between the first clip and the second clip in response to manipulation of the control icon using an input device.

10. The method of claim 8, wherein the transition icon is an animated icon which simulates a transistion in the video program between the first clip and the second clip.

11. The apparatus of claim 8, wherein the transition icon is an animated icon which simulates a transition in the video program between the first clip and the second clip.

12. The method of claim 1, wherein step (c) adds to the video program a special effect transition between a first clip and a second clip, and wherein step (c) includes the steps of:

(d) displaying a first frame on a first track, and a second frame on a second track with an overlap portion of the second frame aligned along the time line with an overlap portion of the first frame;

(e) selecting a first transition icon; and (f) positioning the first transition icon in a third track in alignment with the overlap portion of the second frame.

13. The method of claim 12, wherein step (e) includes the steps of displaying a menu of transition icons including the first transition icon and selecting the first transition icon in response to manipulation of an input device, and wherein step (f) includes a step of dragging the first transition icon from the menu to the third track in response to manipulation of the input device.

14. The method of claim 13, wherein each of the transition icons of the menu is an animated icon which simulates an available transition in the video program.

15. The method of claim 1, wherein step (c) includes the steps of:

displaying a filter menu having control icons representing parameters of a temporally varying filter for filtering a selected one of the clips; and determining the parameters of the temporally varying filter in response to manipulation of the control icons using an input device.

16. The method of claim 15, wherein step (c) includes the step of:

filtering the selected clip with the temporally varying filter.

17. The method of claim 15, wherein the temporally varying filter is a mosaic filter, and the parameters include a start level and a final level for the mosaic filter.

18. The method of claim 1, wherein step (c) includes a step of performing special effects processing on a first clip and a second clip, said step of performing special effects processing including the steps of:

filling an alpha channel of the first clip with a first value;

filling an alpha channel of the second clip with a second value;

performing a first special effect process in which selected data of the first clip are combined with selected data of the second clip to generate a processed clip having an alpha channel; and processing data in the alpha channel of the processed clip to identify one or more edges of said processed clip.

19. The method of claim 18, wherein the first value is a hexadecimal 00 value, and wherein the second value is a hexadecimal 1F value.

20. An apparatus for editing a video program which includes a sequence of clips which have been digitized, each represented by a frame, the width of each frame representing a time duration of the digitized clip represented by that frame, and transitions between the clips, the apparatus comprising:

a monitor;

a mass storage memory for storing the digitized clips;

a processing means coupled to the monitor and the mass storage memory, wherein the processing means is programmed with:

software for displaying a time line, software for generating a display representing the video program on the monitor, the display including a plurality of the frames displayed simultaneously on tracks in a direct time relationship to the time line, together with transition icons representing the transitions between the clips, and software for editing the video program by modifying the display.

21. The apparatus of claim 20, also including:

an input device coupled to the processing means, and wherein the processing means is programmed with software for dynamically generating and displaying new frames in response to commands from the input device for modifying the display.

22. The apparatus of claim 21, wherein each of the frames representing the clips has a left edge aligned at an in point along the time line and a right edge aligned at an out point along the time line, and wherein the processing means is programmed to change an in point of a first of the clips by changing a position along the time line of the left edge of a first frame.

23. The apparatus of claim 21, wherein each of the frames has a left edge aligned at an in point along the time line and a right edge aligned at an out point along the time line, and wherein the processing means is programmed to change an out point of a first of the clips by changing a position along the time line of the right edge of a first frame.

24. The apparatus of claim 21, wherein the display includes a first frame displayed in a first track, a second frame displayed in a second track with an overlap portion of the second frame aligned along the time line with an overlap portion of the first frame and a transition icon displayed in a third track in alignment with the overlap portion of the second frame.

25. The apparatus of claim 24, wherein the transition icon has an associated control icon, and wherein the processing means is programmed with software for modifying a parameter of a transition in the video program between the first clip and the second clip in response to manipulation of the control icon using the input device.

26. The apparatus of claim 21, wherein the processing means is programmed with software for adding to the video program a special effect transition between a first digitized clip and a second digitized clip, in response to steps of:

manipulating the input device to display a frame representing the first digitized clip in a first track, and a second frame representing the second digitized clip in a second track with an overlap portion of the second frame aligned along the time line with an overlap portion of the first frame;

manipulating the input device to select a first transition icon; and manipulating the input device to position the first transition icon in a third track in alignment with the overlap p portion of the second frame.

27. The apparatus of claim 26, wherein the processing means is programmed with:

software for displaying a menu of transition icons including the first transition icon; and software for selecting the first transition icon in response to manipulation of the input device.

28. The apparatus of claim 27, wherein each of the transition icons of the menu is an animated icon which simulates an available transition in the video program.

29. The apparatus of claim 21, wherein the processing means is programmed with:

software for displaying a filter menu having control icons representing parameters of a temporally varying filter for filtering a selected digitized clip; and software for determining the parameters of the temporally varying filter in response to manipulation of the control icons using the input device.

30. The apparatus of claim 29, wherein the processing means is programmed with software for filtering the selected digitized clip with the temporally varying filter.

31. The apparatus of claim 29, wherein the temporally varying filter is a mosaic filter, and the parameters include a start level and a final level for the mosaic filter.

32. The apparatus of claim 20, wherein a first one of the transition icons is displayed in a special effects track, and has a left edge aligned at an in point along the time line and a right edge aligned at an out point along the time line, and wherein the processing means is programmed to change the in point of the first one of the transition icons by changing a position along the time line of the left edge of said first one of the transition icons.

33. The apparatus of claim 20, wherein a first one of the transition icons is displayed in a special effects track, and has a left edge aligned at an in point along the time line and a right edge aligned at an out point along the time line, and wherein the processing means is programmed to change the out point of the first one of the transition icons by changing a position along the time line of the right edge of said first one of the transition icons.

34. The apparatus of claim 20, also including:

a cache memory coupled to the processing means, and wherein the processing means is programmed with software for identifying data needed to modify the display in response to each of the commands for modifying the display, then retrieving from the cache memory at least a first portion of the data currently stored in the cache memory, then retrieving any remaining portion of the data from the mass storage memory, then processing the retrieved data to generate processed data for modifying the display, and caching the retrieved data in the cache memory.

35. The apparatus of claim 20, wherein the processing means is programmed with software for performing special effects processing operation on a first digitized clip and a second digitized clip the operation including the steps of:

filling an alpha channel of the first digitized clip with a first value;

filling an alpha channel of a second digitized clip with a second value;

performing a first special effect process in which selected data of the first digitized clip are combined with selected data of the second digitized clip to generate a processed clip having an alpha channel; and processing data in the alpha channel of the processed clip to identify one or more edges of the processed clip.

36. The apparatus of claim 35, wherein the first value is a hexadecimal 00 value, and wherein the second value is a hexadecimal 1F value.

* * * * *